United States Patent
Zuercher et al.

(10) Patent No.: US 6,639,768 B2
(45) Date of Patent: Oct. 28, 2003

(54) ARC FAULT DETECTOR IMMUNE TO DIMMER TRANSIENTS AND A CIRCUIT BREAKER INCORPORATING THE SAME

(75) Inventors: Joseph C. Zuercher, Brookfield, WI (US); Steven Christopher Schmalz, Greenfield, WI (US)

(73) Assignee: Eaton Corporation, Cleveland, OH (US)

( * ) Notice: Subject to any disclaimer, the term of this patent is extended or adjusted under 35 U.S.C. 154(b) by 132 days.

(21) Appl. No.: 10/029,545

(22) Filed: Dec. 20, 2001

(65) Prior Publication Data

US 2003/0117754 A1 Jun. 26, 2003

(51) Int. Cl.$^7$ ................................. H02H 3/16
(52) U.S. Cl. .................... 361/42; 361/58; 361/44; 361/45
(58) Field of Search ............................ 361/58, 42, 44, 361/45

(56) References Cited

U.S. PATENT DOCUMENTS

| | | | |
|---|---|---|---|
| 5,224,006 A | | 6/1993 | MacKenzie et al. |
| 5,307,230 A | * | 4/1994 | MacKenzie ................ 361/96 |
| 5,459,630 A | * | 10/1995 | MacKenzie et al. .......... 361/45 |
| 5,519,561 A | | 5/1996 | Mrenna et al. |
| 5,682,101 A | | 10/1997 | Brooks et al. |
| 5,691,869 A | | 11/1997 | Engel et al. |
| 5,805,397 A | | 9/1998 | MacKenzie |
| 5,805,398 A | | 9/1998 | Rae |
| 5,815,352 A | | 9/1998 | Mackenzie |
| 5,818,237 A | | 10/1998 | Zuercher et al. |
| 5,896,262 A | | 4/1999 | Rae et al. |
| 5,933,305 A | | 8/1999 | Schmalz et al. |
| 6,088,205 A | | 7/2000 | Neiger et al. |
| 6,232,857 B1 | | 5/2001 | Mason, Jr. et al. |
| 6,300,766 B1 | | 10/2001 | Schmalz |

OTHER PUBLICATIONS

National Semiconductor Corporation, Linear Brief 8, "Precision AC/DC Converters", Aug. 1969, 2 pp.

* cited by examiner

Primary Examiner—Bao Q. Vu
(74) Attorney, Agent, or Firm—Martin J. Moran (57) ABSTRACT

Tripping of a circuit breaker by an arc fault detector is blocked by a disable circuit upon detection of a transient associated with cold turn-on of an incandescent bulb powered by a dimmer. The peak value of pulses generated by the bandpass filter of the arc detector in response to step increases in the ac current is decayed approximately exponentially. The amplitude of each pulse is compared with upper and lower percentage limits of the decaying peak value. If the amplitudes of the pulses remain below the upper threshold for about 3 to 4 half cycles and exceed the lower threshold each half cycle, a dimmer transient is identified and logic is set to block generation of a false arc signal.

15 Claims, 6 Drawing Sheets

ARC FAULT DETECTOR IMMUNE TO DIMMER TRANSIENTS AND A CIRCUIT BREAKER INCORPORATING THE SAME

BACKGROUND OF THE INVENTION

1. Field of the Invention

This invention relates to apparatus responsive to arc faults and particularly to such apparatus which responds to the step changes in current produced when an arc is struck, but which discriminates against the step changes in current produced by a dimmer, and especially a dimmer used with a tungsten bulb that produces a large transient in dimmer current at cold turn on.

2. Background Information

Arc faults can occur in electrical systems, for instance between adjacent paired conductors, between exposed ends of broken conductors, at a faulty connection where carbon deposits have collected on adjacent terminals or outlets, and other situations where conducting elements are in close proximity. Arc faults in ac systems can be intermittent; however, arcs caused by carbon deposits can occur regularly in successive half cycles.

Arc faults typically have high resistance so that the arc current is below the instantaneous or magnetic trip threshold of the conventional circuit breakers. Also, the intermittent nature of an arc fault can create an rms current value that is below the thermal or delayed trip threshold for such circuit breakers. Even so, the arcs can cause damage or start a fire if they occur near combustible materials. It is not practical to simply lower the pick-up currents on conventional circuit breakers as there are many typical loads which draw similar currents and which would, therefore, cause nuisance trips.

Much attention has been directed to trying to distinguish arcing currents from other intermittent currents. One approach recognizes that arc faults can generate a step increase in current when the arc is struck. However, many typical loads generate a similar step increase when a device is turned on. In many cases, the step increase produced by a load is a singular event and can be distinguished from an arc fault which generates repetitive step increases by counting step increases during an interval such as a few half cycles. A more sophisticated variant of this type of arc fault detector maintains a time-attenuated accumulation of step increases in current and generates a trip when a selected level of the accumulation is reached. This type of detector provides a faster trip on large step increases while reducing nuisance trips.

A dimmer circuit provides unique problems for an arc fault detector which responds to the step increases generated by the striking of an arc. A dimmer, when phased back, produces a pattern of step increases in current each half cycle. Under steady state conditions, the amplitude of this pulse will be below that of an arc current, and can, therefore, be distinguished on that basis. However, if the dimmer is used to control a tungsten bulb, the cold filament has a very low resistance on startup, which produces a large initial pulse with subsequent pulses decaying in amplitude as the filament rapidly warms up. This characteristic of a dimmer has also been used to distinguish it from arc faults, but it still has been necessary to maintain the threshold for arc detection well above the handle rating to avoid nuisance tripping on a dimmer.

As mentioned, carbon arc faults can strike in successive half cycles and thus look very similar to a dimmer. This presents a difficult challenge in meeting code requirements for a reliable response to carbon arcs while rejecting nuisance trips in response to a dimmer including turn-on of a cold tungsten bulb.

Known prior art apparatus which seeks to provide immunity to dimmers energizing tungsten bulbs attempt to reduce the sensitivity of the detector to the dimmer transient at cold turn-on.

There is room therefore for improvement in detectors and circuit breakers providing protection in electrical circuits which are subject to the transient currents generated by cold turn-on of a tungsten bulb by a dimmer.

SUMMARY OF THE INVENTION

The present invention rather than just reducing the sensitivity to transients caused by dimmers energizing a tungsten bulb during cold turn-on, disables the arc fault detector under these conditions to provide complete immunity to the phenomenon. The invention is applicable to arc fault detectors and to circuit breakers incorporating arc fault detectors which respond to pulses generated for each step change in current in the ac electrical circuit. The response means generating the arc signal is disabled when the pulses track within a predetermined margin the pulses generated by a dimmer under certain conditions such as those created by a dimmer energizing a cold tungsten bulb.

More particularly, the invention relates to apparatus for detecting arc faults generating step changes in current each time an arc is struck in an ac electrical circuit having a dimmer generating in successive half cycles step changes in current which, under certain transient conditions, produce a dimmer transient current in which the step changes in current decay in amplitude in successive half cycles approximately exponentially from an initial transient value to a steady state value. The apparatus comprises pulse generating means for generating a pulse signal having a pulse for each step change in current in the ac electrical circuit, and response means responsive to repeated pulses generated by the step changes in current above the steady state value for generating an arc signal. The apparatus further includes disabling means responsive to the pulse signal for preventing the response means from generating the arc signal when the pulses in the pulse signal track the dimmer transient current within a predetermined margin.

In accordance with a preferred embodiment, the disabling means comprises a peak detector generating a decaying peak signal which is initially proportional to the initial value of the step change in the dimmer transient current under these certain conditions and which then decays, preferably approximately exponentially. The disabling means can include tracking means for tracking the decaying peak signal and generating a disable signal only so long as the amplitude of the pulse signal remains less than an upper percentage of the decaying peak signal and more than a lower percentage of the decaying peak signal. Also preferably, the tracking means includes a first timer blocking generation of the disable signal until the pulse signal has remained less than the upper limit for a selected time period. This time period can be a predetermined number of half cycles of the ac current, for example, at least three half cycles. The tracking means can also include a second timer blocking generation of the disable signal when the pulse signal does not exceed the lower percentage of the decaying peak signal during each half cycle.

The peak detector can also include a reference signal generator generating a first reference signal which is the upper percentage of the decaying peak signal and a second reference signal which is the lower percentage of the decaying peak signal. In this case, the tracking means can include a first comparator comparing the pulse signal to the first reference signal, a second comparator comparing the pulse signal to the second reference signal and logic means generating the disable signal when the first comparator indicates that the pulse signal is less than the first reference signal and the second comparator indicates that the pulse signal is more than the second reference signal. Where the logic is digital, the tracking means can include blocking means for delaying the first comparator from setting the digital logic for generating a disable signal until the pulse signal remains below the first reference signal for a predetermined number of half cycles. The tracking means can also include second blocking means setting the logic to block the generation of the disable signal when the pulse signal does not exceed the second reference signal during a half cycle.

The invention also embraces a circuit breaker incorporating an arc fault detector as described.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
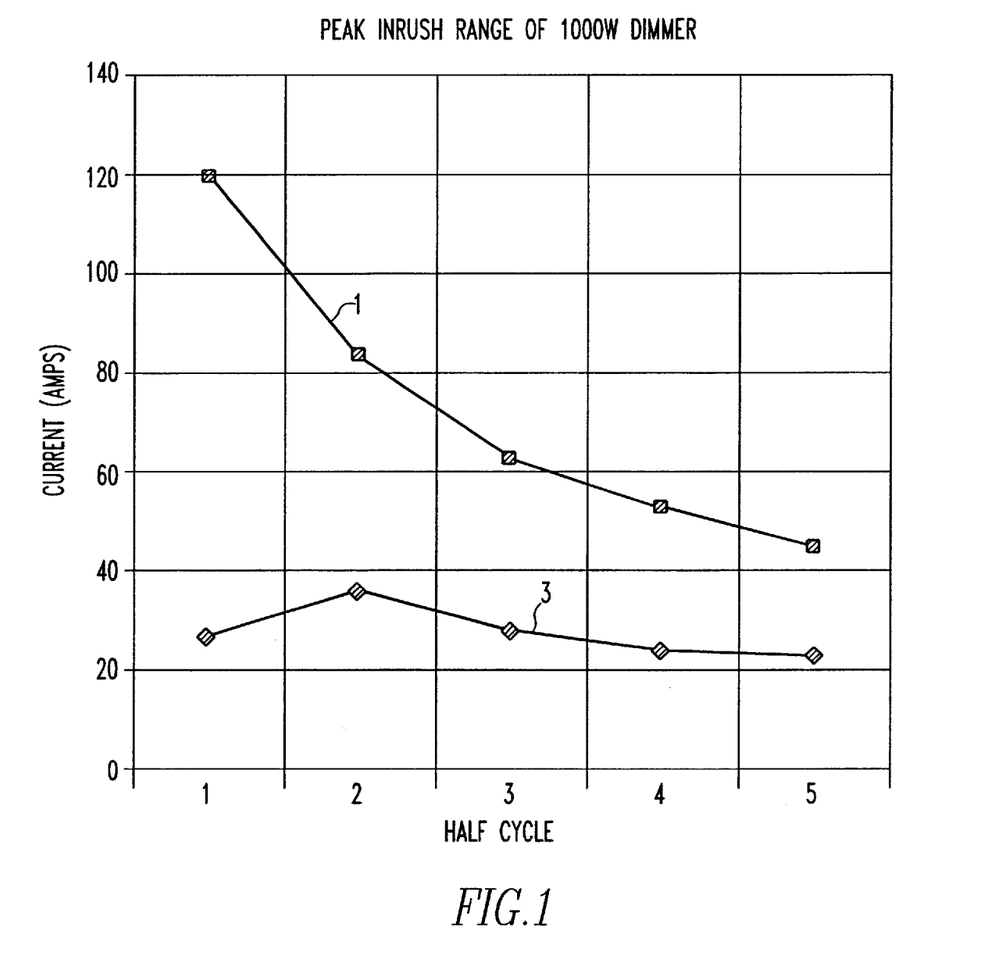
FIG. 1 is a plot of a statistical analysis of the range of decay rates for a dimmer energizing a cold tungsten bulb.
Figure 2:
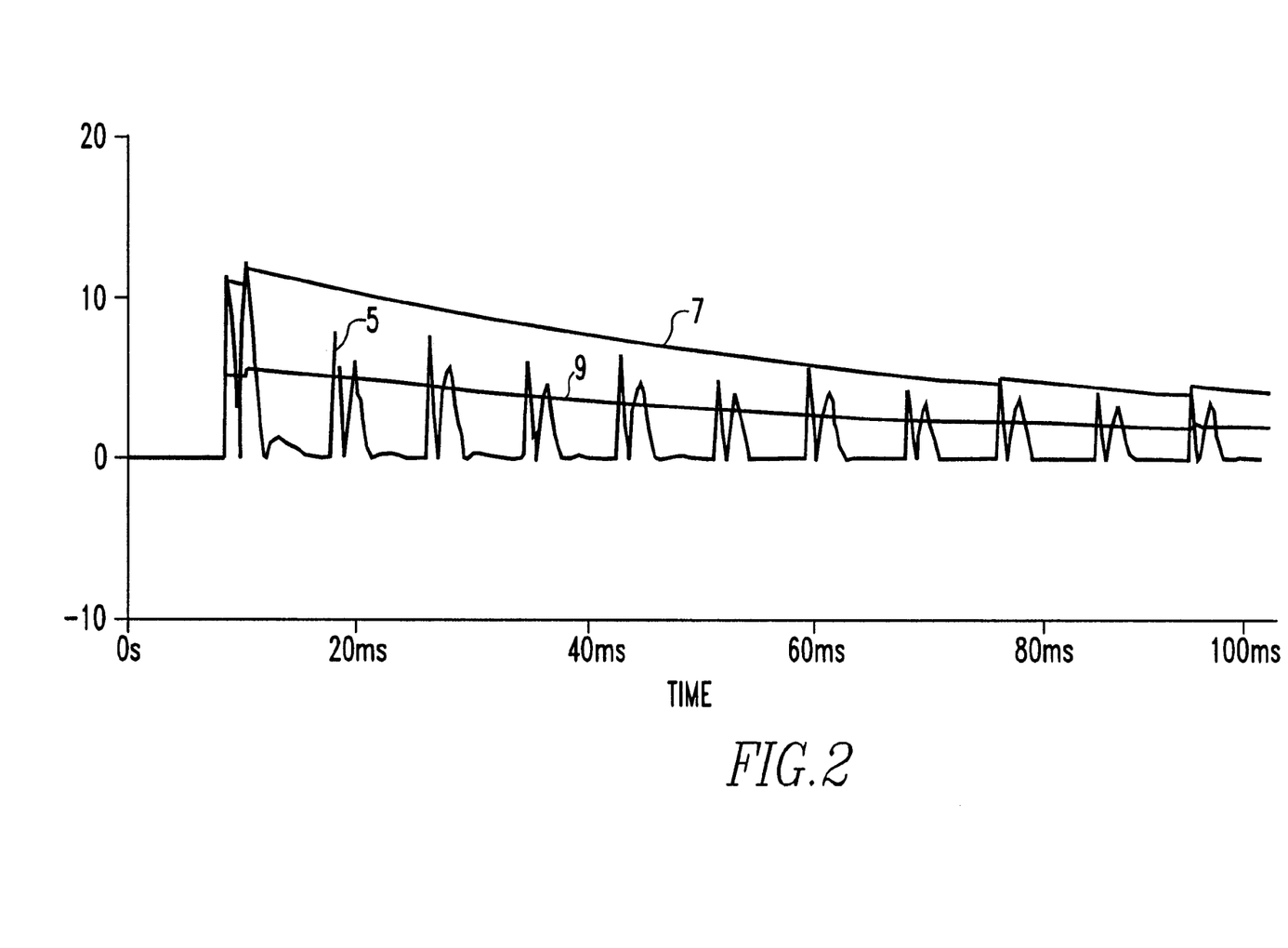
FIG. 2 is a plot of dimmer current which has been passed through a bandpass filter illustrating the decaying peak value of the resulting pulses plotted against upper and lower exponentially decaying limits.

As mentioned, the major distinguishing trait of a dimmer controlled incandescent lamp is the extremely high step increase in current as it is turned on. These large current steps continue for multiple half-cycles until the lamp filament reaches operating temperature and then settles below a minimum level. In general, this decay in magnitude is monotonic and nearly exponential. A statistical analysis shows that the dimmer decay rate under these transient conditions falls within a defined range, or corridor, bounded by an upper limit 1 and a lower limit 3 plotted in FIG. 1. It has been found that if the magnitudes of successive step changes in current lie within this corridor, the likelihood of the load being a dimmer energizing a cold tungsten bulb is quite high. In fact, simulations of actual load waveform data have shown that a dimmer could be reliably detected after only 3 to 4 half cycles of 60 Hz line current. As shown in the plot of FIG. 2 where the step changes in current generated by a dimmer load of 1.45 kW at 20% duty cycle have been converted by a bandpass filter to pulses shown by the trace 5, all of the peaks of the pulses in the trace 5 after the initial pulse lie within the corridor defined by the upper and lower thresholds of 1 and 3 for multiple half cycles after the initial peak.

Figure 3:
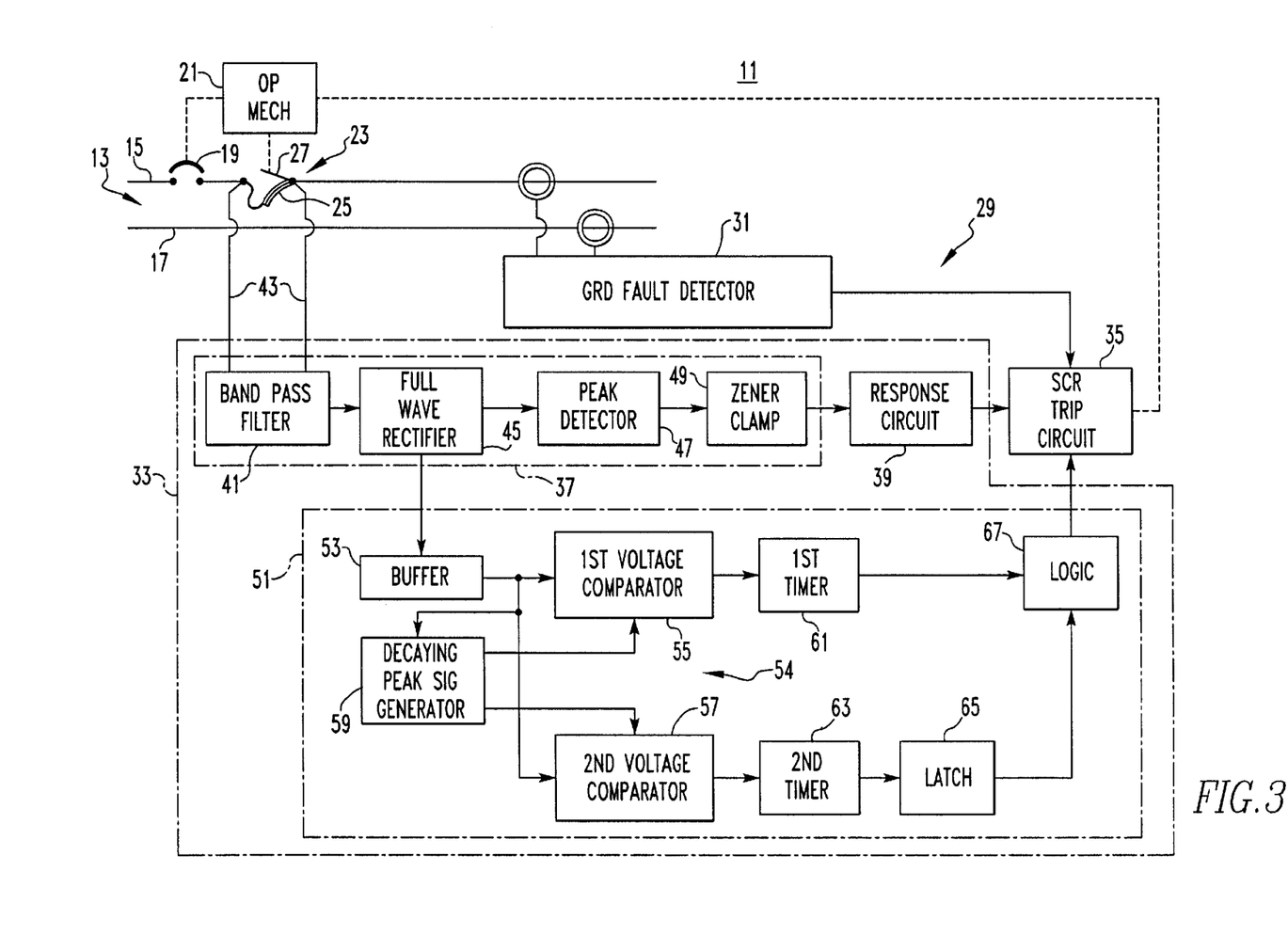
FIG. 3 is a schematic diagram, mostly in block form of a circuit breaker incorporating an arc fault detector in accordance with the invention.

The invention utilizes this phenomenon to discriminate between arc faults and turn-on of a dimmer controlled incandescent bulb. FIG. 3 illustrates schematically such a circuit breaker. The circuit breaker 11 provides protection for an ac electrical circuit 13, which includes a line conductor 15 and a neutral conductor 17. The circuit breaker 11 includes separable contacts 19 which are opened and closed by an operating mechanism 21. A thermal magnetic trip device 23 includes a bi-metal 25 which responds to persistent overcurrents to trip the operating mechanism 21 and open the separable contacts 19 and a magnetic armature 27 which trips the operating mechanism in response to instantaneous overcurrents, all as is well known.

The circuit breaker 1 in addition includes an electronic trip circuit 29 which incorporates a ground fault detector 31 and an arc fault detector 33. The ground fault detector 31, which can be of any well known type, responds to ground faults by operating silicon rectifier (SCR) trip circuit 35 which actuates the operating mechanism 21 to open separable contacts.

The arc fault detector 33 is of the general type which responds to the step increases in current generated when an arc is struck, an example of which is described in U.S. Pat. No. 5,805,398. Such an arc fault detector 33 includes a pulse generator 37 and a response circuit 39. The pulse generating circuit 37 includes a bandpass filter 41 which generates a pulse in response to each step increase in current in the ac electrical circuit which is detected by a shunt connection formed by the leads 43 monitoring the voltage drop across the resistance of the bi-metal 25. The pulses output by the bandpass filter 41 have an amplitude which is proportional to the amplitude of the step increases in the current in the ac electrical system. The pulse generating circuit 37 includes a full wave rectifier 45, a peak detector 47 and a zener clamp 49 to generate unipolar pulses which are limited in amplitude by the zener clamp. The zener clamp 49 reduces the effect of the large pulses generated by the inrush current produced by incandescent bulb turn-on under dimmer control, but still takes such pulses into account. The response circuit produces a time-attenuated accumulation of the pulses generated by the pulse generator 37 and actuates the SCR trip circuit 35 if the accumulation reaches a trip value.

The present invention adds to the arc fault detector 33 a disabling circuit which prevents generation of the arc fault signal upon detection of a pattern in the pulses indicative of turn-on of a dimmer controlled incandescent bulb. The disabling circuit 51 includes a buffer 53 which applies the current pulse signal to a tracking circuit 54, which includes a first voltage comparator 55 and a second voltage comparator 57 which track the pulse signal to determine if it remains within the corridor discussed in connection with FIG. 1. This is accomplished by comparing the pulse signal in the first voltage comparator 55 to a first reference signal which represents the upper limit of the corridor and comparing it in the second voltage comparator to a second reference signal representing the lower limit of the corridor. These reference signals are generated by a decaying peak signal generator 59.

In order to assure the presence of an incandescent bulb turned on by a dimmer, the pulse signal must remain below the upper limit for a selected time period which can be a number of half cycles such as, for instance, at least three half cycles. This selected time interval is established by a first timer 61. In addition, the pulse signal must exceed the lower limit during each half cycle. This is determined by a second timer 63 which switches a latch 65 if the second voltage comparator 57 does not detect the pulse signal rising above the lower limit for the interval of a half cycle. The first timer 61 prevents logic 67 from generating a disable signal to block generation of an arc signal by the SCR trip circuit 35 until the first timer 61 indicates that the pulse signal has stayed below the upper limit for the selected number of half cycles as long as the second timer 63 has not timed out, indicating that the lower limit has been exceeded in each half cycle.

Figure 4:
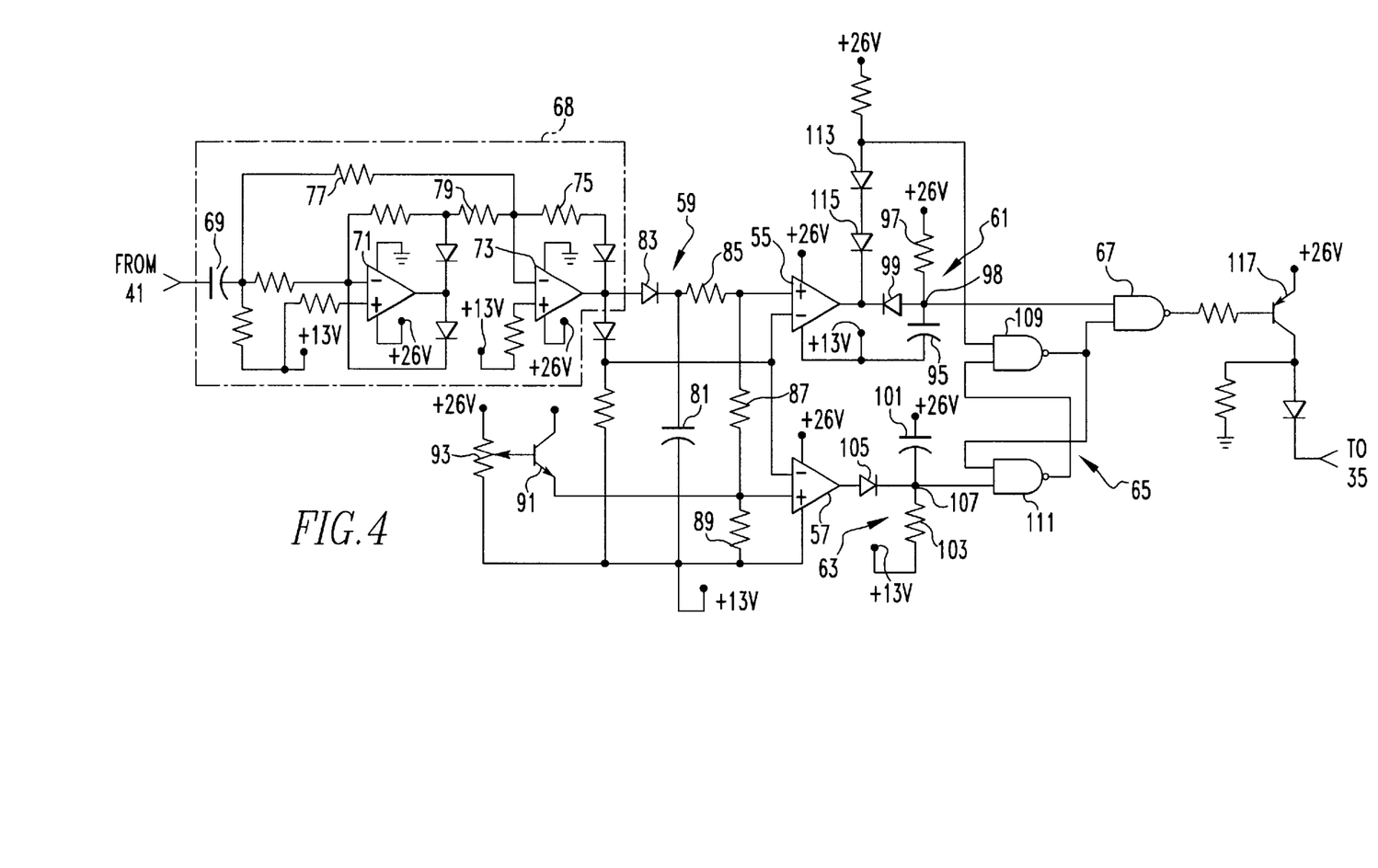
FIG. 4 is a schematic circuit diagram of a disabling circuit in accordance with the invention which is part of the circuit breaker of FIG. 3 that disables generation of an arcing signal in response to cold turn-on of a tungsten bulb energized by a dimmer.

A schematic circuit diagram of the disabling circuit 51 is shown in FIG. 4. While in FIG. 3 the buffer 53 received a full wave rectified output of the bandpass filter 41, the buffer 68 in FIG. 4 alternatively incorporates a precision full wave rectifier and receives the pulse signal directly from the bandpass filter 41. This buffer rectifier 68 includes an ac coupling capacitor 69, a first op amp 71 and a second op amp 73. The pulse signal is applied to the inverting input of each of these op amps. The first op amp 71 with its feedback circuits serves as a half wave rectifier and the second op amp 73 sums the input pulse signal and the output of the half wave rectifier. For negative input pulses, the first op amp 71 has no output and the second op amp 73 produces a positive pulse having an amplitude which is minus the ratio of resistor 75 to resistor 77. For positive input pulses, the output of the first op amp 71 goes low to draw current through the resistor 79. The second op amp 73 sums the currents through resistors 79 and 77. The value of the resistor 79 is made one-half the value of the resistor 77 so that the output gain is the same for positive and negative input pulses.

The peak detector 59 includes a capacitor 81 which is charged through the diode 83 and is shunted by the series connection of resistors 85, 87, 89. As the initial pulse will have the greatest amplitude for turn-on of a cold tungsten bulb by a dimmer, the voltage across the capacitor 81 will decay, generally exponentially with the time constant determined by the values of the capacitor 81 and the resistors 85, 87 and 89. These resistors also form a voltage divider which produces a first, upper reference signal which is applied to the noninverting input of the first voltage comparator 55 and a second, lower reference signal which is applied to the inverting input of the second voltage comparator 57. In the exemplary circuit, the values of the resistors 85, 87, 89 are selected so that the upper reference is approximately 90% of the decaying peak voltage while the lower reference signal is approximately 40%. A minimum value for the lower reference is set by a transistor 91 which is biased by a potentiometer 93.

The output of the first voltage comparator 55 is connected through the first timer 61 to digital logic 67 in the form of a NAND gate. The first timer 61 includes a capacitor 95 and a resistor 97. The node 98 between the capacitor 95 and resistor 97 is connected to the output of the first comparator 55 through diode 99. When there is no pulse signal input to the disabling circuit, the output of the comparator 55 is low and the capacitor 95 discharges through the diode 99. If an incandescent bulb powered by a dimmer is turned on, the initial pulse applied to the inverting input of first comparator 55 will be above the reference voltage to hold the output low. As the bulb heats up, the pulses will decay and their amplitude will be less than the upper limit reference applied to the first voltage comparator 55 so that the output will go high. This allows the capacitor 95 to begin to charge through the resistor 97 and after three to four half cycles with the pulse signal remaining above the upper limit, the input applied to the NAND 67 will be high. If at any time before then, the pulse signal exceeds the upper reference signal applied to the first comparator 55, the output will again go low to immediately discharge the capacitor 95 and reset the timing interval.

The second timer 63 connected to the output of the second voltage comparator 57 includes a capacitor 101 in series with a resistor 103 and a voltage source. The node between the capacitor 101 and the resistor 103 is connected to the output of the second voltage comparator 57 through diode 105. This node is also connected to the set input of the latch 65 formed by a SR flip-flop. If there is no pulse signal, the bias voltage applied to the inverting input of the second voltage comparator 57 causes the output to go low and therefore, the voltage at the node 107 is at system ground (plus 13 V) to apply a digital zero signal to the set input of the latch. If a pulse is applied to the disable circuit 51 with a magnitude which exceeds the bias on the second voltage comparator 57, its output will go high to discharge the capacitor 101 and place a digital ONE on the set input of the latch 65. After each pulse the output of the second voltage comparator 57 goes low, and the capacitor 101 begins to charge. However, the time constant is such that as long as a pulse greater than the lower reference percentage at least as great as the bias signal occurs each half cycle, a digital ONE will be continuously applied to the set input of the latch.

The SR flip-flop or latch 65 is formed by a pair of NANDs 109 and 111. The set input is the lower input of NAND 111 and the reset input is the upper input of NAND 109. As mentioned, the set input is controlled by the second voltage comparator 57 through the second timer 63. The reset input is controlled by the first voltage comparator 55. When the output of the first voltage comparator 55 is low, the reset input is pulled low through diodes 113 and 115. When the output of the first voltage comparator 55 goes high, the reset input of the flip-flop 65 goes high.

The output of the latch or flip-flop 65 is applied to the second input of NAND 67. With both inputs high, NAND 67 goes low to turn on a transistor 117 to generate a disable signal preventing the turn-on of the SCR circuit 35, and therefore, blocking generation of an arc signal. With no pulse signal, the output of the first voltage comparator 55 is low to pull the upper input to NAND 67 low, which keeps the transistor 117 turned off, thereby allowing the arc detection circuit to generate an arcing signal if warranted.

When an incandescent bulb controlled by a dimmer is turned on, the first pulse keeps the output of the first voltage comparator 55 low and the transistor 117 remains turned off. As the pulses begin to decay, the output of the first voltage comparator 55 goes high as the decaying peak value of the pulses falls below the upper reference percentage. This resets the flip-flop 65, but the upper input to the NAND 67 is kept low by the first timer 61. With a pulse exceeding the lower reference percentage each cycle, a digital ONE is applied to the set input of the flip-flop 65. With ONEs on the set and reset inputs, the latch 65 puts a ONE on the lower input of NAND 67 which stays high because of the upper input. As long as the pulse signal amplitude remains below the upper reference percentage, but above the lower, the first timer 61 times out after about three or four half cycles, and NAND 67 will turn on transistor 117 indicating a dimmer.

With time, the incandescent bulb warms up and the pulses generated by the dimmer stabilize in amplitude. As can be seen from FIG. 2, the upper and lower reference signals 7 and 9, respectively, continue to decay and eventually, after an additional number of half cycles (8 in the example), the upper limit falls below the steady state amplitude of the pulses generated by the dimmer. This causes the output of the first voltage comparator 55 to go low resulting in turn-off of the transistor 117 and termination of the disable signal as the output of NAND 67 goes high. In a similar manner, if the pulses output by the bandpass filter 41 are the result of arcing, rather than a dimmer, they will be random in both repetition rate and amplitude, so that the upper reference will be repetitively exceeded before the timer 61 times out, thereby keeping the output of NAND 67 high and the transistor 117 turned off.

The randomness of an arcing signal will also result in a half cycle during which the amplitude of the pulse signal will not exceed the lower reference signal. This means that the output of the second voltage comparator 57 remains low long enough for the second timer 63 to time out changing the set input to the latch 65 from a ONE to a ZERO. As the pulse signal under these circumstances will also have an amplitude which is below the upper reference signal, so that the output of the first voltage comparator is high and a ONE is applied to the reset input of the latch 65, the output of the latch will go low to make the output of NAND 67 high blocking the generation of disable signal by holding transistor 117 off. Even though subsequent pulses exceed the lower reference to again apply a ONE to the set input of the latch 65, the output will not change back to a ONE until the pulse amplitude again exceeds the upper reference.

Figure 5:
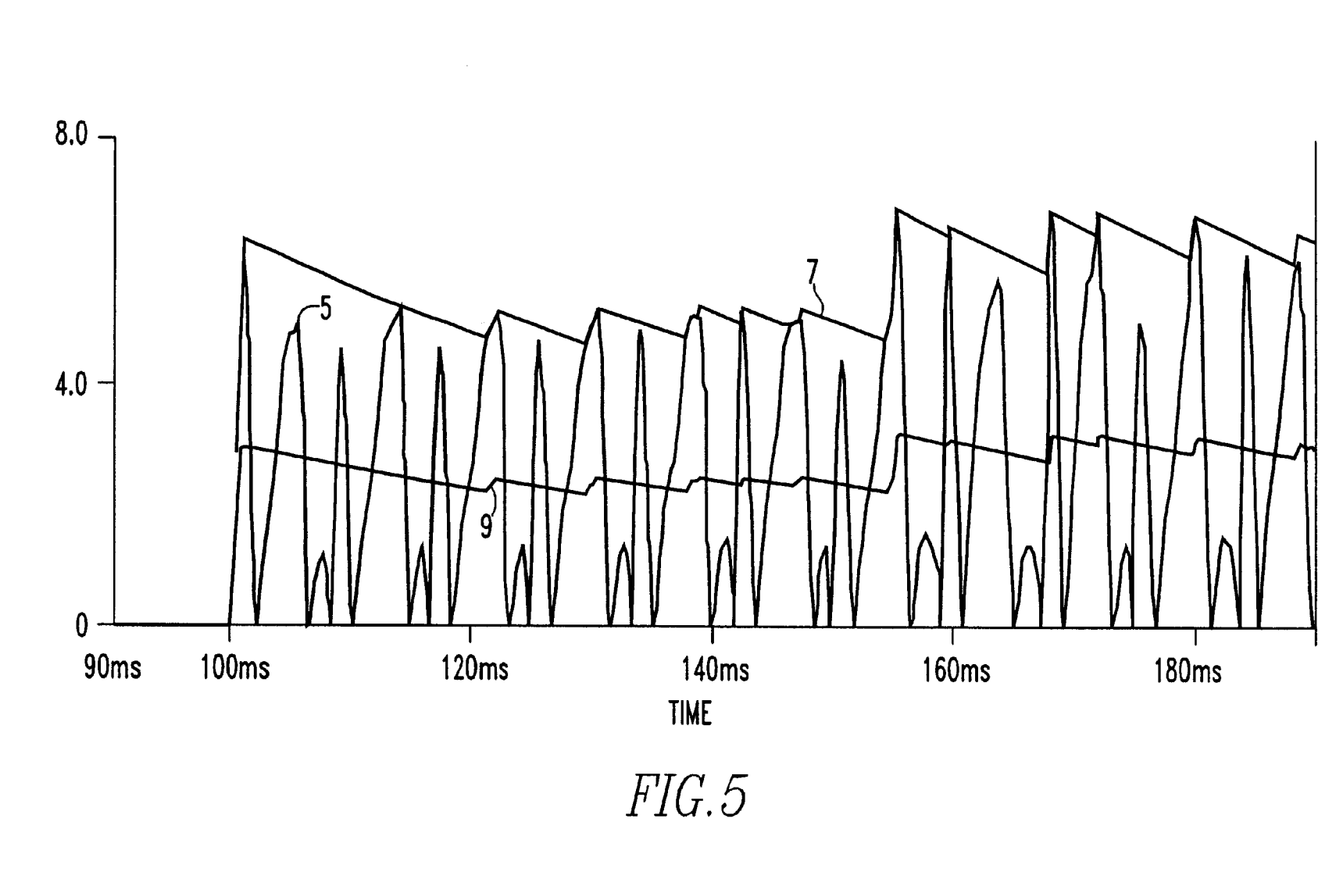
FIG. 5 is a waveform diagram illustrating the response of a portion of the circuit of FIG. 4 to a carbon arc.
Figure 6:
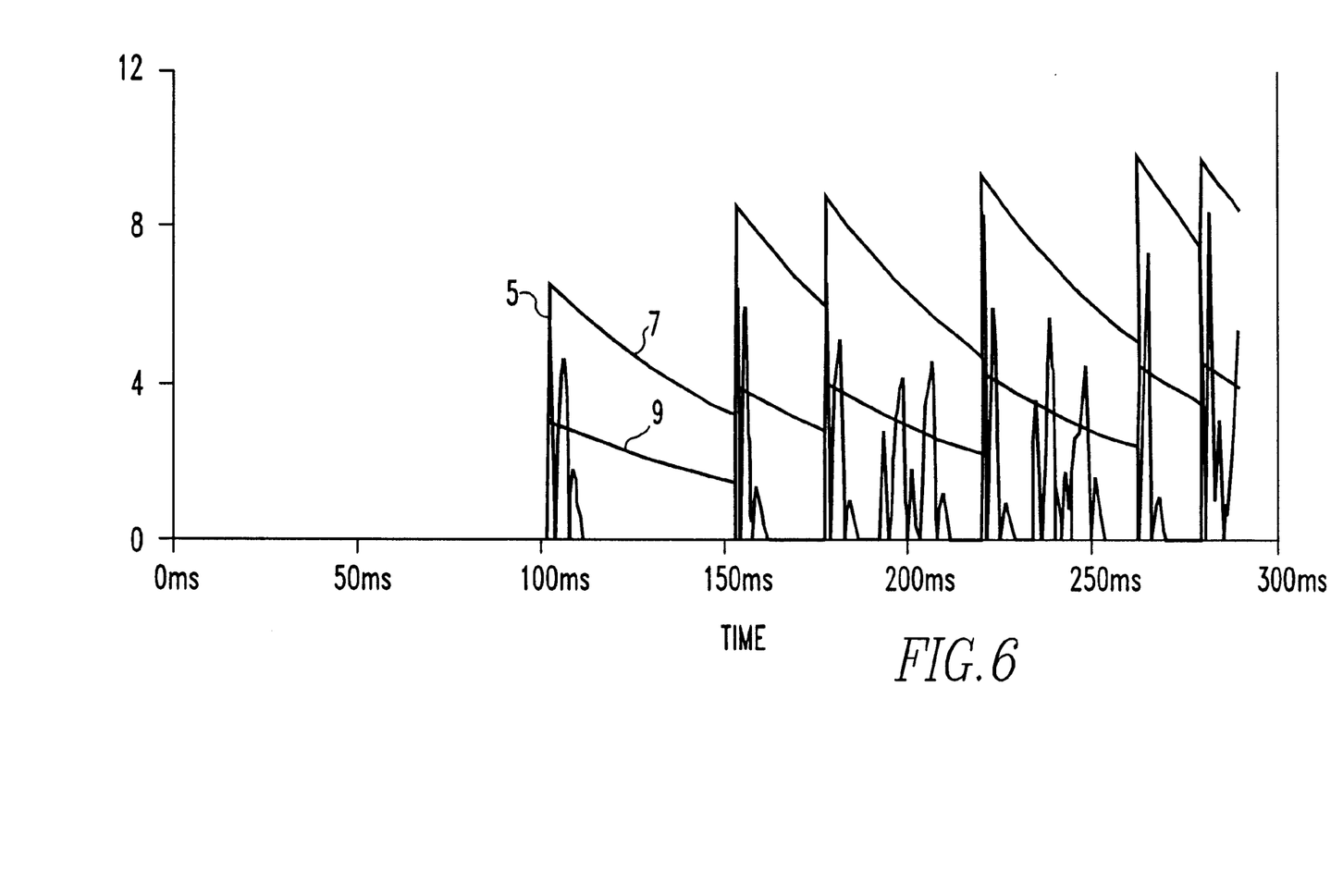
FIG. 6 is a waveform diagram illustrating the response of a portion of the circuit of FIG. 4 to a random arc.

Thus, the disable circuit 51 detects turn-on of a dimmer controlled incandescent bulb within 3–4 half cycles and blocks the generation of a false arcing signal, but resets after about eight half cycles. It should be noted that if at any time a true arc occurs, the disable circuit is reset because the upper reference limit will be exceeded. FIG. 5 illustrates operation in response to a carbon arc load in which pulses are generated in virtually every half cycle, but vary in amplitude. It can be seen that the first timer never has an opportunity to time out because subsequence peaks exceed the upper reference limit within the timing interval of the first, long period timer 61. These peaks reset both timers. FIG. 6 illustrates the pattern of pulses plotted against the upper and lower reference signals in response to random arcing which is simulated by guillotine severance of an electrical conductor. Such an arc is more sporadic than a carbon arc. There are periods of time following an initial pulse during which no pulse greater than the lower reference threshold occurs. Thus, the second, short period timer 63 is not held in reset and times out before the 3 to 4 half cycles have passed. Therefore, the NAND 67 remains in the ONE state keeping the transistor 117 turned off indicating the absence of a dimmer.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. Apparatus for detecting arc faults generating step changes in current each time an arc is struck in an ac electrical circuit having a dimmer generating in successive half cycles step changes in current which under certain transient conditions produce a dimmer transient current in which the step changes in current decay in amplitude in successive half cycles approximately exponentially from an initial transient value to a steady state value, the apparatus comprising:

pulse generating means for generating a pulse signal having a pulse for each step change in current in the ac electrical circuit;

response means responsive to repeated pulses generated by step changes in current above the steady state value for generating an arc signal; and disabling means responsive to the pulse signal for preventing the response means from generating the arc signal when the pulses in the pulse signal track the dimmer transient current within a predetermined margin.

2. The apparatus of claim 1, wherein the disabling means comprises a peak detector generating a decaying peak signal which is initially proportional to the initial value of the step change in dimmer transient current and which then decays.

3. The apparatus of claim 2, wherein the decaying peak signal decays approximately exponentially.

4. The apparatus of claim 2, wherein the disabling means further includes tracking means for tracking the decaying peak signal and generating a disable signal disabling the response means only so long as amplitude of the pulse signal remains less than an upper percentage of the decaying peak signal and more than a lower percentage of the decaying peak signal.

5. The apparatus of claim 4, wherein the tracking means include a first timer blocking generation of the disable signal until the pulse signal has remained less than the upper percentage of the decaying pulse signal for a selected time period.

6. The apparatus of claim 5, wherein the selected time period is a predetermined number of half cycles of the ac current.

7. The apparatus of claim 6, wherein the number of half cycles is at least three.

8. The apparatus of claim 5, wherein the tracking means further includes a second timer blocking generation of the disable signal when the pulse signal does not exceed the lower percentage of the decaying peak signal during each half cycle of the ac current.

9. The apparatus of claim 4, wherein the peak detector includes a reference signal generator generating a first reference signal which is the upper percentage of the decaying peak signal and a second reference signal which is the lower percentage of the decaying peak signal, and wherein the tracking means comprises a first comparator comparing the pulse signal to the first reference signal, a second comparator comparing the pulse signal to the second reference signal, and logic means generating a disable signal when the first comparator indicates that the pulse signal is less than the first reference signal and the second comparator indicates that the pulse signal is more than the second reference signal.

10. The apparatus of claim 9, wherein the logic is digital logic and the tracking means includes first blocking means for delaying the first comparator from setting the digital lock logic for generating the disable signal until the pulse signal has remained below the first reference signal for a predetermined number of half cycles.

11. The apparatus of claim 10, wherein the tracking means includes second blocking means setting the digital logic to block generation of the disable signal when the pulse signal does not exceed the second reference signal during a half cycle.

12. The apparatus of claim 11, wherein the first and second blocking means comprise a capacitor and a resistor connected in series between a voltage source and ground, and a diode connected to a node between the capacitor and the resistor and the respective comparator, the node also being connected to the digital logic.

13. An arc fault circuit breaker providing protection from arc faults generating step changes in current each time an arc is struck in an ac electrical circuit having the dimmer generating in successive half cycles step changes in current which under certain transient conditions produce a dimmer transient current in which the step changes in current decay in amplitude in successive half cycles approximately exponentially from an initial transient value to a steady state value, the circuit breaker comprising:

separable contacts;

an operating mechanism opening the separable contacts in response to a trip signal; and a trip unit generating a trip signal in response to selected current conditions in the electrical circuit, and including an arc fault detector generating a trip signal in response to an arc fault, the arc fault detector comprising:

pulse generating means for generating a pulse signal having a pulse for each step change in current in the AC electrical circuit;

response means responsive to repeated pulses generated by step changes in current above the steady state value for generating the trip signal; and disabling means responsive to the pulse signal for preventing the response means for generating the arc signal when the pulses in the pulse signal track the dimmer transient current within a predetermined margin.

14. The apparatus of claim 13, wherein the disabling means comprises a peak generator generating a decaying peak signal which is initially proportional to the initial value of the step change in dimmer transient current and which then decays approximately exponentially, and tracking means for tracking the decaying peak signal and generating a disable signal which disables the response means from generating a trip signal only so long as the amplitude of the pulse signal remains less than an upper percentage of the decaying peak signal and more than a lower percentage of the decaying peak signal.

15. The circuit breaker of claim 14, wherein the tracking means includes a first timer blocking generation of the disable signal until the pulse signal has remained less than the upper percentage of the decaying peak signal for a predetermined number of half cycles and a second time blocking generation of the disable signal when the pulse signal does not exceed the lower percentage of the decaying peak signal during each half cycle.

* * * * *